(12) United States Patent
Yip

(10) Patent No.: US 7,151,571 B2
(45) Date of Patent: Dec. 19, 2006

(54) DIGITAL CAMERA FOR USE BY RIGHT-HANDED AND LEFT-HANDED PEOPLE

(75) Inventor: Thomas W. Yip, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 10/370,839

(22) Filed: Feb. 21, 2003

(65) Prior Publication Data

US 2004/0165107 A1    Aug. 26, 2004

(51) Int. Cl.
*H04N 5/225* (2006.01)
(52) U.S. Cl. ........................ 348/373; 348/376
(58) Field of Classification Search ............... 348/373, 348/371, 376, 333.06; 396/540
See application file for complete search history.

(56) References Cited

U.S. PATENT DOCUMENTS

| | | | |
|---|---|---|---|
| 4,208,113 A | 6/1980 | Prochnow | |
| 4,329,041 A | 5/1982 | Madge et al. | |
| 4,493,542 A | 1/1985 | Ohmura et al. | |
| 4,819,016 A | 4/1989 | Leonard et al. | |
| 5,043,822 A | 8/1991 | Ichiyoshi et al. | |
| 5,528,337 A | 6/1996 | Kawano | |
| 5,694,633 A | 12/1997 | Knutzen | |
| 5,715,491 A | 2/1998 | Pankhurst | |
| 5,729,289 A * | 3/1998 | Etoh | 348/333.02 |
| 5,742,341 A | 4/1998 | Ohishi et al. | |
| 5,946,506 A | 8/1999 | Uematsu | |
| 6,079,883 A | 6/2000 | Mori | |
| 6,215,524 B1 | 4/2001 | Shiozaki | |
| 6,226,448 B1 | 5/2001 | Takagi et al. | |
| 6,295,088 B1 | 9/2001 | Tsukahara et al. | |
| 6,308,084 B1 * | 10/2001 | Lonka | 455/556.1 |
| 6,323,903 B1 | 11/2001 | Poulsen et al. | |
| 6,339,447 B1 | 1/2002 | Kurahashim et al. | |
| 6,459,857 B1 * | 10/2002 | Kawamura et al. | 396/374 |
| 6,643,459 B1 | 11/2003 | Ota | |
| 6,720,997 B1 * | 4/2004 | Horie et al. | 348/218.1 |
| 6,721,014 B1 * | 4/2004 | Ariga | 348/374 |
| 6,774,939 B1 * | 8/2004 | Peng | 348/231.4 |
| 6,961,087 B1 * | 11/2005 | Yoshida | 348/231.1 |
| 2001/0004269 A1 * | 6/2001 | Shibata et al. | 348/333.06 |
| 2002/0054761 A1 | 5/2002 | Cornell et al. | |
| 2004/0036791 A1 * | 2/2004 | Voss et al. | 348/333.07 |
| 2005/0200703 A1 * | 9/2005 | Kobayashi et al. | 348/207.2 |
| 2006/0055806 A1 * | 3/2006 | Tsukahara et al. | 348/333.06 |

FOREIGN PATENT DOCUMENTS

| | | |
|---|---|---|
| EP | 0216153 | 4/1987 |
| JP | 02240645 | 9/1990 |
| JP | 2000-347271 | * 12/2000 |

OTHER PUBLICATIONS

P Abs Jap v153 No. 51, Sep. 5, 1991, Fuji Photo Film.
P Abs Jap v134 No. 89, Nov. 7, 1989, Toray Ind. Inc.

* cited by examiner

*Primary Examiner*—Vivek Srivastava
*Assistant Examiner*—Kelly Jerabek

(57) ABSTRACT

A digital camera for use by both left-handed and right-handed users. The digital camera has a body design that employs a swivel mechanism and symmetric placement of pertinent camera hardware components, particularly flash devices.

18 Claims, 2 Drawing Sheets

DIGITAL CAMERA FOR USE BY RIGHT-HANDED AND LEFT-HANDED PEOPLE

TECHNICAL FIELD

The present invention relates generally to digital cameras, and more specifically, to a digital camera that may be used by right-handed and left-handed users.

BACKGROUND

The assignee of the present invention manufactures digital cameras and other computer-related equipment. Currently, most cameras are built for right-handed people with a large grip made for the right hand. Currently, there are no digital cameras that allow use by both right and left handed users. It would be desirable to have a digital camera that allows use by both left-handed and right-handed users.

A search regarding the present invention was performed in the US Patent and Trademark Office and uncovered the following US patents and published applications: U.S. Pat. No. 6,295,088, U.S. Pat. No. 6,079,883, U.S. Pat. No. 5,715,491, U.S. Pat. No. 4,329,041, U.S. Pat. No. 5,528,337, U.S. Pat. No. 6,226,448, U.S. Pat. No. 5,043,822, U.S. Pat. No. 5,946,506, U.S. Pat. No. 5,742,341, U.S. Pat. No. 4,208,113, U.S. Pat. No. 4,819,016, U.S. Pat. No. 6,339,447, U.S. Pat. No. 6,215,524, U.S. Pat. No. 6,323,903, and US Patent Application Publication No. 2002/0054761.

With regard to those of the above-listed patent that appear generally relevant to the present invention, U.S. Pat. No. 4,208,113 discloses a "camera has a housing and a T-shaped handgrip turnably mounted on a side wall of the housing. A shutter release element is mounted in the housing." U.S. Pat. No. 4,208,113 also discloses that "It is already known to provide cameras which detachable handgrips which, moreover, can be turned with reference to the camera housing. The purpose of this is to facilitate the operation of the camera by making the handgrip turnable about an axis which extends transverse (usually in normal) to the optical axis of the camera lens. Because of this the camera can be more conveniently operated while being held in either the left hand or the right hand of a user, and the arrangement also has further advantages in terms of camera operation."

However, U.S. Pat. No. 4,208,113 does not disclose or suggest anything regarding digital cameras, liquid crystal display (LCD), batteries, flash units, or a digital camera having multiple flash units.

U.S. Pat. No. 5,946,506 discloses a "single lens reflex camera" that "includes a rotatable built-in flash unit." However, U.S. Pat. No. 5,946,506 does not disclose or suggest anything regarding digital cameras, liquid crystal display (LCD), batteries, or a digital camera having multiple flash units.

US Patent Application Publication No. 2002/0054761 discloses a "Photographic camera having lens movement control with pivotable grip surfaces and adjacent shutter release." However, while the handgrip is pivotable, it does not rotate into positions that allow right-handed and left-handed use of the camera. Also, US Patent Application Publication No. 2002/0054761 does not disclose or suggest anything regarding liquid crystal display (LCD), batteries disposed in a handgrip, or multiple flash units.

U.S. Pat. No. 6,295,088 discloses a "portable electronic device includes a display component and a device aperture component which are mounted on separate segments of the electronic device. Each segment can be rotated with respect to the other, thus permitting a user to photograph an object while adjusting the display to a desired viewing condition." However, U.S. Pat. No. 6,295,088 does not disclose or suggest a digital camera having multiple flash units that are collocated in a rotatable portion of the camera body containing a liquid crystal display (LCD).

Accordingly, it is an objective of the present invention to provide for improved digital camera that may be gripped and used by both left-handed and right-handed people.

SUMMARY OF THE INVENTION

To accomplish the above and other objectives, the present invention provides for a digital camera that is operable by both left-handed to right-handed users. The digital camera has a body design that may be used as easily by right-handed people as it is for left-handed people. This design employs a swivel mechanism and symmetric placement of major camera hardware components.

More particularly, the present digital camera comprises a handgrip section and a body section that rotate relative to each other. The handgrip section includes a power button having a lock latch, a shutter button, a strap connection, a swivel lock, and a battery compartment for housing batteries. The body section has a rear surface that comprises a liquid crystal display, microphone, joystick pad, zoom control dial, a plurality of buttons for setting functions of the camera, and an output port that may be used to download images to a computer. A lens, which is preferably a zoom lens, extends from a front surface of the camera, and one or more metering elements are disposed on the front surface of the camera. Upper and lower pop-up flash devices are disposed on upper and lower surfaces of the camera.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
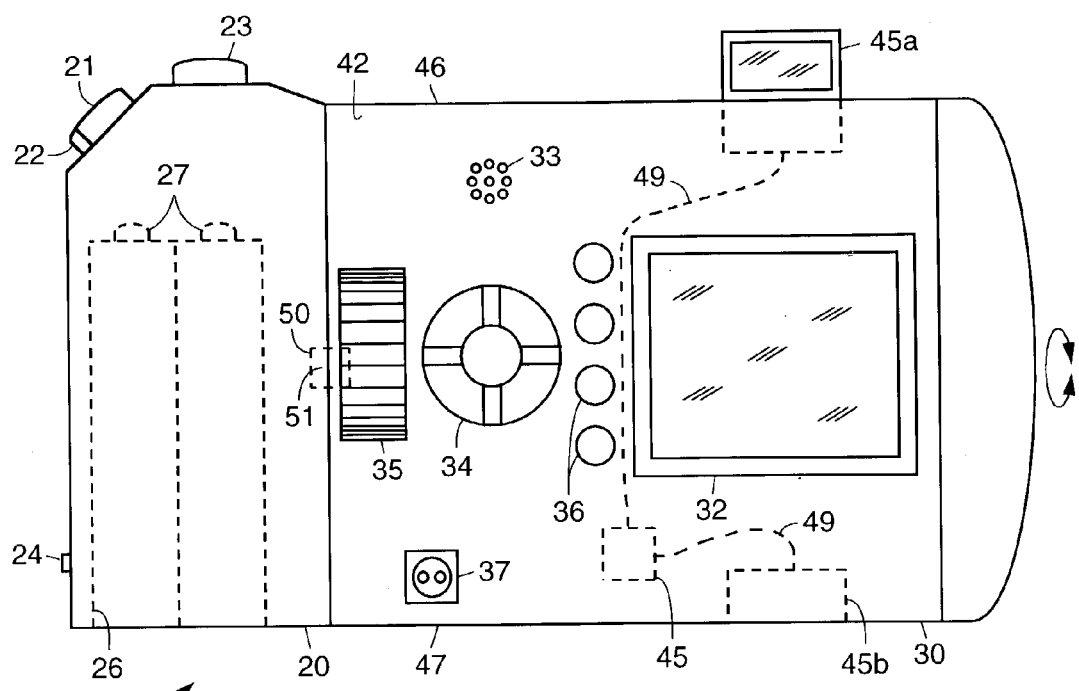
FIG. 1 is a rear view of an exemplary embodiment of a digital camera in accordance with the principles of the present invention that is configured for use by a right-handed user.
Figure 2:
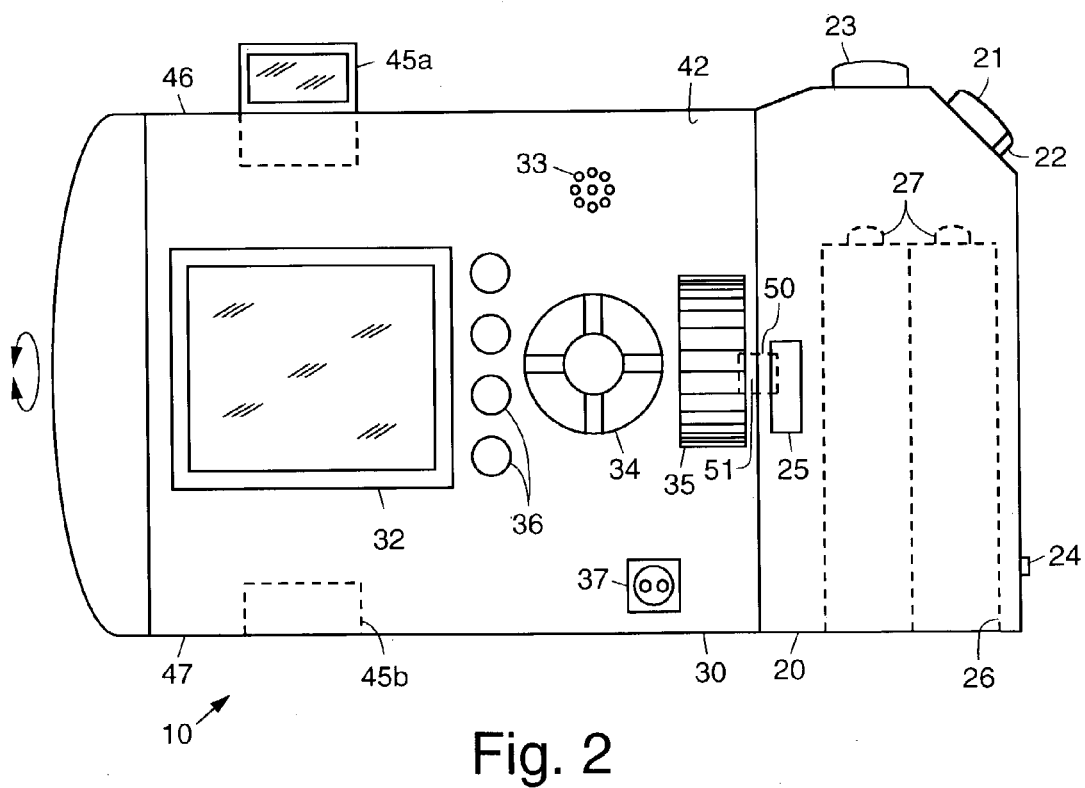
FIG. 2 is a rear view of the exemplary digital camera configured for use by a left-handed user.
Figure 3:
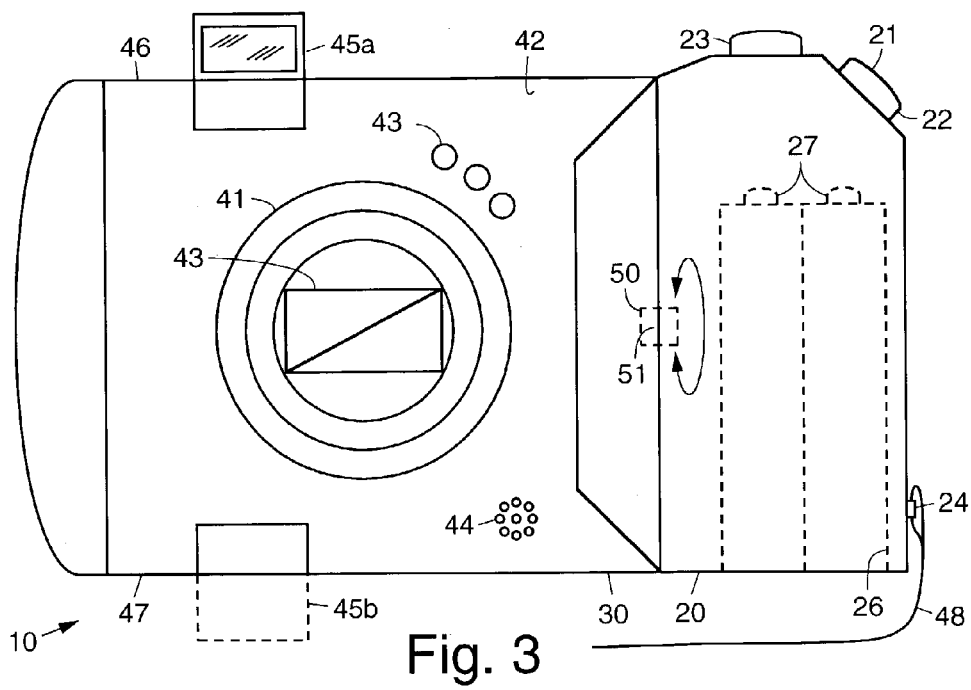
FIG. 3 is a front view of the exemplary digital camera.
Figure 4:
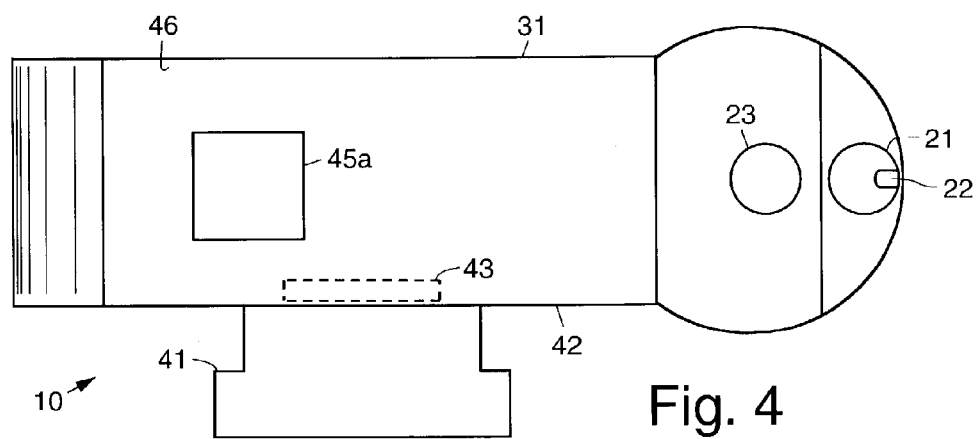
FIG. 4 is a top view of the exemplary digital camera.
Figure 5:
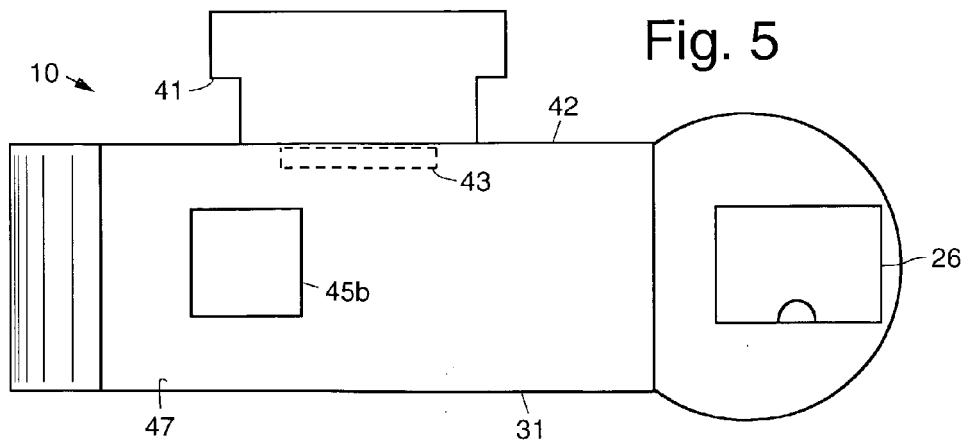
FIG. 5 is a bottom view of the exemplary digital camera.

Referring to the drawing figures, FIG. 1 illustrates a perspective-like rear view of an exemplary embodiment of a digital camera 10 in accordance with the principles of the present invention. The digital camera shown in FIG. 1 is configured for use by a right-handed user. FIG. 2 is a perspective-like rear view of the exemplary digital camera 10 configured for use by a left-handed user. FIG. 3, shows a front view of the exemplary digital camera 10. FIGS. 4 and 5 show top and bottom views, respectively, of the exemplary digital camera 10.

The exemplary digital camera 10 comprises a handgrip section 20 and a body section 30 that rotate relative to each other at abutting side surfaces. The handgrip section 20 includes a power button 21 having a lock latch 22, a shutter button 23, a strap connection 24, a swivel lock 25 and a battery compartment 26 for housing batteries 27 (shown in FIG. 3). The swivel lock 25 engages the body section 30 at two locations within the body section 30, one adjacent a rear surface 31 of the camera 10 and one adjacent a front surface 42 of the camera 10.

As is shown in FIGS. 1 and 2, the rear surface 31 of the body section 30 comprises a liquid crystal display (LCD) 32, a rear microphone 33, a joystick pad 34, a zoom control dial 35, a plurality of buttons 36 for setting functions of the camera 10 and an output port 37 for downloading images to a computer, for example. A dual flash comprising upper and lower pop-up flash devices 45a, 45b are disposed on upper and lower surfaces 46, 47 of the camera 10. However, it is to be understood that a single flash device 45a may be used which may be disposed in either the handgrip section 20 or preferably the body section 30.

The dual flash may be implemented with two separate flash devices 45a, 45b mounted on the top and bottom of the camera body section 30 as is illustrated in the drawing figures. Alternatively (shown in FIG. 1 only), a single flash device 45 or generator 45 may be disposed in the body section 30 of the camera 10. Light pipes 49 may be used to direct the light flash to whichever of the flash devices 45a, 45b is open. In this case, the flash devices 45a, 45b are reflectors that reflect the light flash toward the image scene. This reduces the cost of the camera 10 since only one flash device 45 is needed and since light pipes 49 are relatively inexpensive.

Referring to FIG. 3, it is a front view of the exemplary digital camera 10. As is shown in FIG. 3, a zoom lens 41 extends from the front surface 42 of the camera 10. A shutter 43 is disposed within the body section 30 that is visible behind the lens 41. One or more metering elements 43 are disposed on the front surface 42 of the camera 10. A front microphone 44 is disposed on the front surface 42 of the camera 10. A strap 48 is shown connected to the strap connection 24.

As is illustrated in FIGS. 1–3, the handgrip section 20 and body section 30 rotate relative to each other by means of a rotary joint 50 that is centered relative to the abutting surfaces thereof. A rotary connector 51 is preferably provided adjacent to or is part of the rotary joint 50 that couples battery power from the batteries 27 to the components in the body section 30. In addition, the rotary connector 51 couples a shutter control signal from shutter button 23 in the handgrip section 20 to the body section 30 to control the shutter 43.

Alternatively, flexible wiring may be used to couple power and the shutter signal between the handgrip section 20 and body section 30. It is preferred that the handgrip section 20 does not swivel more than 180 degrees in either direction. This prevents the flexible wiring, for example, from getting kinked up if the handgrip section 20 were allowed to freely rotate.

To change the configuration of the camera 10 from right-handed to left-handed use, a user would disengage the swivel lock 25 and rotate the grip section 20 one-hundred-and-eighty (180) degrees clockwise or counterclockwise relative to the body section 30 until the swivel lock 25 reengages on the opposite side of the camera 10. The pop-up flash device 45a at the upper surface 46 of the camera 10 would be closed and the pop-up flash device 45b at the lower surface 47 of the camera 10 would be opened for use.

Thus, a digital camera that may be gripped and used by both left-handed and right-handed people has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A digital camera comprising:
   a handgrip section that comprises a power button, a shutter button, a swivel lock and a battery compartment for housing batteries;
   a body section that rotates relative to the handgrip section at abutting side surfaces thereof and that comprises:
   a rotary joint that couples the handgrip section to the body section and that permits rotation of the body section substantially one-hundred-and-eighty degrees clockwise or counterclockwise relative to the handgrip section;
   a rear surface comprising a liquid crystal display, a microphone, a joystick pad, one or more buttons for setting functions of the camera, and an output port;
   a lens extending from a front surface;
   a shutter disposed behind the lens;
   a metering element disposed on the front surface; and
   at least one flash device for generating a light flash.

2. The digital camera recited in claim 1 wherein the swivel lock engages the body section at a location adjacent the rear surface of the camera and at a location adjacent the front surface of the camera.

3. The digital camera recited in claim 1 further comprising:
   a rotary connector for coupling battery power from the batteries to components in the body section and for coupling a shutter control signal from shutter button in the handgrip section to the body section to control the shutter.

4. The digital camera recited in claim 1 further comprising:
   flexible wiring for coupling power from the batteries to components in the body section and for coupling a shutter control signal from shutter button in the handgrip section to the body section to control the shutter.

5. The digital camera recited in claim 1 wherein the power button further comprises a lock latch.

6. The digital camera recited in claim 1 further comprising a strap connection disposed on the handgrip section.

7. The digital camera recited in claim 1 wherein the lens comprises a zoom lens.

8. The digital camera recited in claim 1 further comprising a zoom control dial disposed on the rear surface.

9. The digital camera recited in claim 1 wherein the at least one flash device comprises upper and lower flash devices disposed at upper and lower surfaces of the body section.

10. The digital camera recited in claim 1, wherein the flash device comprises:
    a single flash device for generating a light flash;
    upper and lower reflectors disposed at upper and lower surfaces of the body section; and
    light pipes for directing the light flash to a selected one of the upper and lower reflectors.

11. A digital camera comprising:
    a handgrip section that comprises a power button, a shutter button, a swivel lock and a battery compartment for housing batteries;
    a body section that rotates relative to the handgrip section at abutting side surfaces thereof and that comprises:

a rotary joint that couples the handgrip section to the body section and that permits rotation of the body section substantially one-hundred-and-eighty degrees clockwise or counterclockwise relative to the handgrip section;

a rear surface comprising a liquid crystal display, a microphone, a joystick pad, a zoom control dial, one or more buttons for setting functions of the camera, and an output port;

a zoom lens extending from a front surface;

a shutter disposed behind the lens;

a metering element disposed on the front surface; and at least one flash device for generating a light flash.

12. The digital camera recited in claim 11 wherein the swivel lock engages the body section at a location adjacent a rear surface of the camera and at a location adjacent a front surface of the camera.

13. The digital camera recited in claim 11 further comprising:

a rotary connector for coupling battery power from the batteries components in the body section and for coupling a shutter control signal from shutter button in the handgrip section to the body section to control the shutter.

14. The digital camera recited in claim 11 further comprising:

flexible wiring for coupling power from the batteries components in the body section and for coupling a shutter control signal from shutter button in the handgrip section to the body section to control the shutter.

15. The digital camera recited in claim 11 wherein the power button further comprises a lock latch.

16. The digital camera recited in claim 11 further comprising a strap connection disposed on the handgrip section.

17. The digital camera recited in claim 11 wherein the at least one flash device comprises upper and lower flash devices disposed at upper and lower surfaces of the body section.

18. The digital camera recited in claim 11 wherein the flash device comprises:

a single flash device for generating a light flash;

upper and lower reflectors disposed at upper and lower surfaces of the body section; and light pipes for directing the light flash to a selected one of the upper and lower reflectors.

* * * * *

UNITED STATES PATENT AND TRADEMARK OFFICE
CERTIFICATE OF CORRECTION

PATENT NO. : 7,151,571 B2 Page 1 of 1
APPLICATION NO. : 10/370839
DATED : December 19, 2006
INVENTOR(S) : Thomas W. Yip It is certified that error appears in the above-identified patent and that said Letters Patent is hereby corrected as shown below:

In column 4, line 26, in Claim 2, delete "adjacent the" and insert -- adjacent a --, therefor.

In column 4, line 27, in Claim 2, delete "adjacent the" and insert -- adjacent a --, therefor.

In column 4, line 38, in Claim 4, after "batteries" delete "to".

In column 4, line 55, in Claim 10, after "claim 1" delete ",".

In column 4, line 57, in Claim 10, after "generating" delete "a" and insert -- the --, therefor.

Signed and Sealed this

Twelfth Day of May, 2009

JOHN DOLL
*Acting Director of the United States Patent and Trademark Office*